(No Model.)

F. A. PERRET.
FIELD MAGNET.

No. 495,562. Patented Apr. 18, 1893.

WITNESSES:
Frank S. Ober
Jos. J. Uhl.

INVENTOR
Frank A. Perret
BY
M. A. Rosenbaum
ATTORNEY.

UNITED STATES PATENT OFFICE.

FRANK A. PERRET, OF SPRINGFIELD, MASSACHUSETTS, ASSIGNOR TO THE ELEKTRON MANUFACTURING COMPANY, OF NEW YORK.

FIELD-MAGNET.

SPECIFICATION forming part of Letters Patent No. 495,562, dated April 18, 1893.

Application filed October 28, 1892. Serial No. 450,267. (No model.)

*To all whom it may concern:*

Be it known that I, FRANK A. PERRET, a citizen of the United States, residing at Springfield, in the county of Hampden and State of Massachusetts, have invented certain new and useful Improvements in Field-Magnets, of which the following is a full, clear, and exact description.

This invention relates to field magnets for dynamo electric machines and motors, and has special reference to magnets built up of plates or layers of iron.

The invention is also applicable, to a certain extent, to solid field magnets.

The invention consists of the formation and location of a joint in the magnet or magnetic circuit whereby great strength and simplicity in construction, and high efficiency are obtained.

Figure 1:
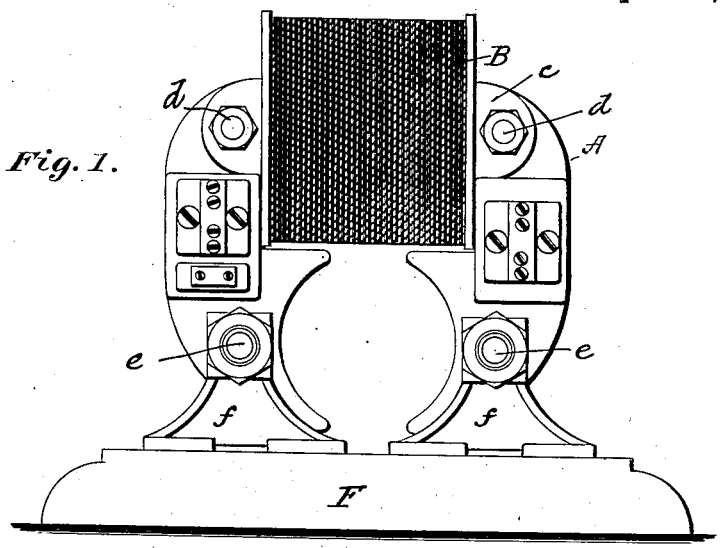
Figure 2:
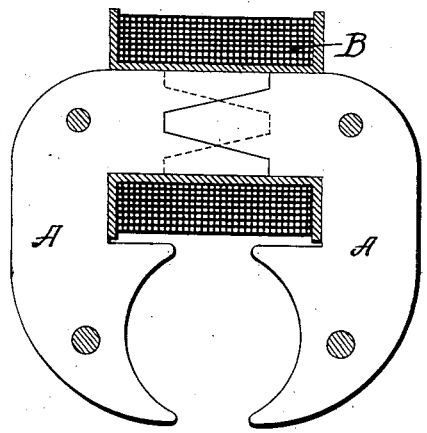
Figure 3:
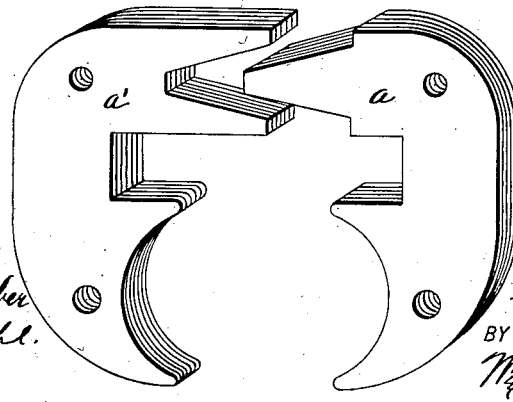

In the accompanying drawings, Figure 1 represents an end elevation of the field magnet complete. Fig. 2 represents a vertical section of the field magnet taken on a plane parallel to the axis of the coil, and Fig. 3 represents a view of a pair of plates, of which the magnetic circuit is built up, illustrating how they are joined together.

Referring to the drawings by letter, A represents the iron portion of the magnetic circuit of a field magnet, and B represents the field magnet coil. In the construction illustrated, the iron magnetic circuit is U-shaped, and a single coil is placed on the back yoke. The iron portion of the magnet is built up of plates or laminæ, which are in two parts a, a' joined near the center of the back yoke, at a point where the coil B will surround the joint. The form of the joint is that of a wedge; that is, one of the parts a has a projecting wedge-shaped portion, while the other a' has a correspondingly shaped notch or inlet; thus, one of them forms the male, and the other the female. The plates are assembled by placing all of the males on one side, and all the females on the other side. The surfaces of the joint are made smooth, so that they will make a close contact everywhere and in as much as these plates may be stamped out by machinery and made accurate, the act of joining the two sides together centers the two parts, and properly locates the pole pieces with respect to the armature space.

It will be observed that my invention is not confined to a wedge form of any particular angle; nor is it confined to a single wedge on one side, and a single channel on the other, as similar results may be obtained by using two or more wedges and channels in a single joint. One of the advantages obtained by this wedge-shaped connection is the extensive contact surface at the joint, which lowers the resistance of the magnetic circuit. It is furthermore clear that this joint is applicable to solid magnets as well as to built up magnets. When the plates of which the magnet is built up are not too thin or too numerous, each alternate pair of them may be reversed; that is, the male plate may be first placed on one side and then on the other, in which case the plates would overlap at the joint and thus add to the rigidity thereof. This construction is indicated in dotted lines in Fig. 2. I find that when the joint in the magnetic circuit is located inside of the coil, the magnet is much stronger and the self-induction of the coil is reduced.

When the plates are assembled they are held together by terminal plates c, c, through the ends of which and through the plates, bolts d, d, are passed. The plates are furthermore held by two other bolts e, e, passing respectively through the pole pieces. The ends of these bolts rest in bolsters or brackets f, f, which support the magnet on the base F.

Another advantage of this construction is noted in the fact that a field magnet core having a certain cross-section, may be made more compact than those field magnets in which the plates of each pair overlap at the joint, as the overlapping construction necessitates blank spaces between the plates.

Having described my invention, I claim—

1. In a dynamo electric machine or motor, a field magnet having an iron core constructed in two parts, each part provided with a pole piece, and the parts being connected together by a wedge or V-shaped joint, the length of which is in the direction of the lines of force passing through the core, for the purpose set forth.

2. In a dynamo electric machine or motor, a field magnet having an iron core constructed in two parts, each part provided with a pole piece, and the parts being connected together by a wedge or V-shaped joint, the length of which is in the direction of the lines of force passing through the core, in combination with a single coil or spool surrounding the joint, substantially as described.

3. In a dynamo electric machine or motor, a field magnet constructed in two parts connected together by a wedge or V-shaped joint, each of said parts having a pole piece and a coil of wire surrounding and inclosing the joint between the parts, substantially as described.

4. In a dynamo electric machine or motor, a field magnet having an iron core constructed in two parts, each part provided with a pole piece, and the parts being connected together by a wedge or V-shaped joint, substantially as and for the purpose described.

In testimony whereof I subscribe my signature in presence of two witnesses.

FRANK A. PERRET.

Witnesses:
WILLIAM A. FERRY,
JAMES L. MADDIGAN.